Figure 5:
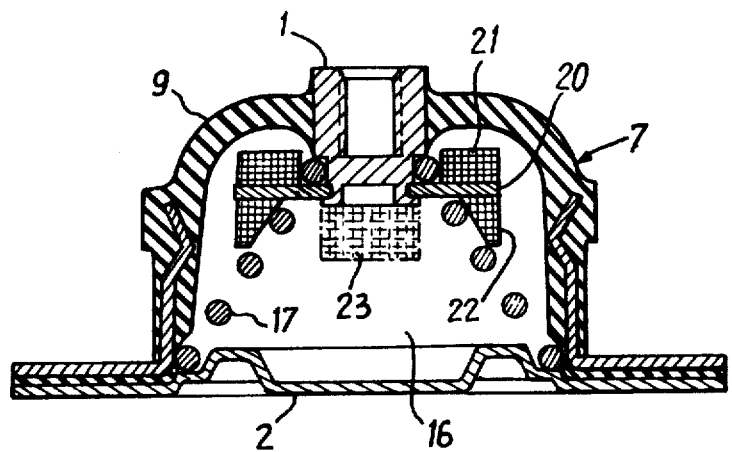

United States Patent

Vernier

[11] 3,874,646
[45] Apr. 1, 1975

[54] VIBRATION INSULATORS
[75] Inventor: Pierre Vernier, Lausanne, Switzerland
[73] Assignee: ARFINA Anstalt fur continentale und Vebersee-Finansinteressen, Vaduz, Liechtenstein
[22] Filed: Dec. 18, 1973
[21] Appl. No.: 425,934

[52] U.S. Cl. .............. 267/136, 248/358 R
[51] Int. Cl. .................................. F16f 3/07
[58] Field of Search............. 248/358 R, 9, 21, 24; 267/136, 137

[56] References Cited
UNITED STATES PATENTS
3,658,314  4/1972  Luzgicza ................ 248/358 R
3,721,417  3/1973  Skala ..................... 248/24

Primary Examiner—James B. Marbert
Attorney, Agent, or Firm—Brisebois & Kruger

[57] ABSTRACT

An insulator against vibrations having two rigid members for connection respectively to parts of a system subject to vibrations. One of the rigid members is of flattened shape and an envelope of deformable resilient material connects the two members. A portion of the envelope has the shape of a cup and receives at its centre the other of the rigid members, the envelope being filled with a high viscosity material.

13 Claims, 6 Drawing Figures

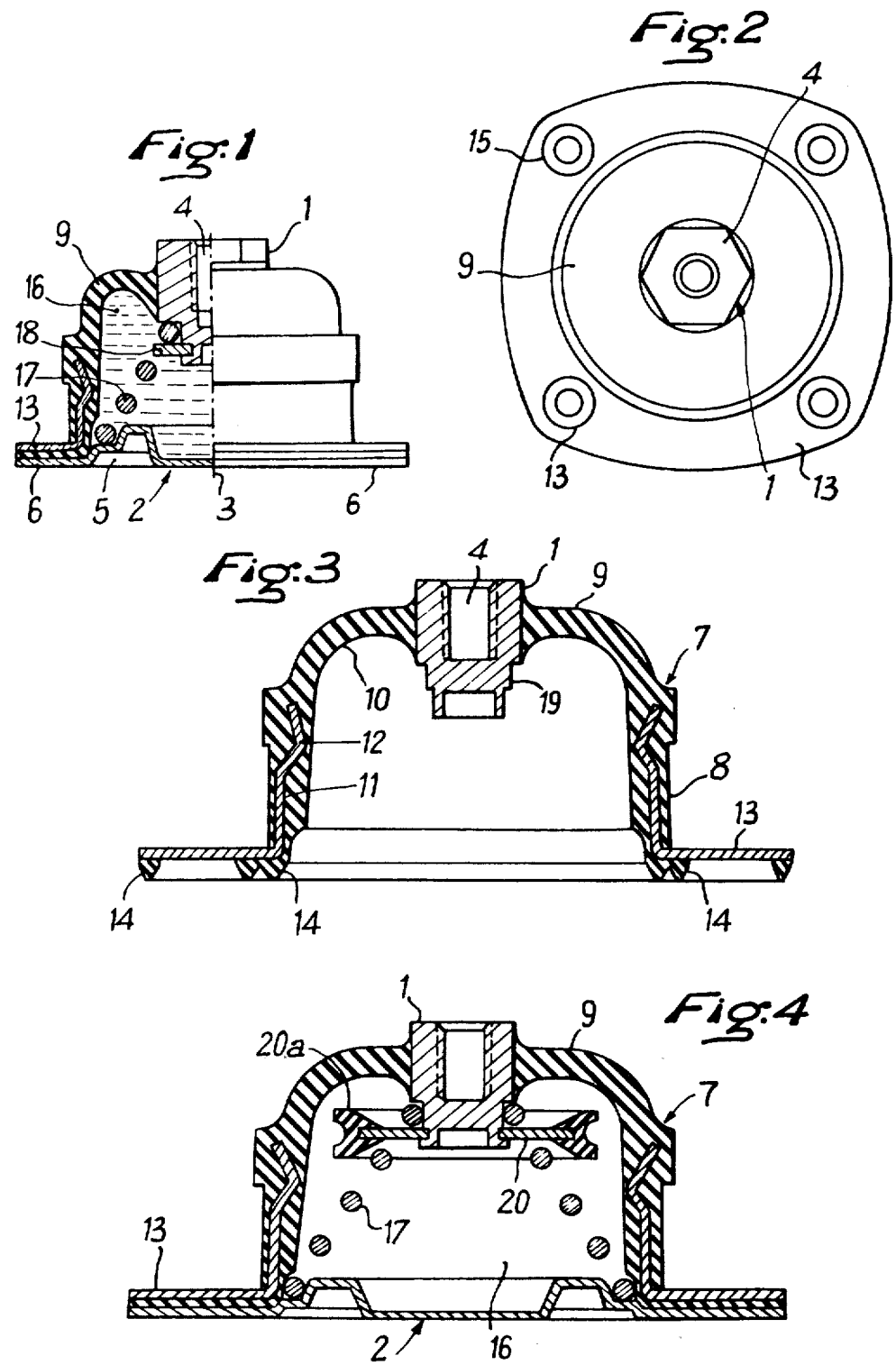

VIBRATION INSULATORS

The present invention refers to an insulator against vibrations. The insulator in accordance with the invention can be employed in a large number of applications in which it is a question of insulating a certain device, for example, a vehicle chassis, from a source of vibration such, for example, as an engine.

There already exist a large variety of anti-vibration insulators. Hitherto, however, the insulators are characterized by extremely poor properties of damping of vibrations. Further, in the existing devices it is not easy to deal separately with the damping characteristics and the insulating characteristics, which represents a very serious disadvantage when it is a question in practice of producing an insulator responding to a certain system of vibrations.

The present invention purposes to supply a vibration-damper which whilst exhibiting very high damping enables in addition, through its conception, separate adjustment of the insulation characteristics as a function of the special cases which are encountered in practice.

The object of the invention is an insulator against vibrations characterized by the fact that it comprises in combination first and second rigid coaxial members intended to be attached respectively to two parts of a system subjected to vibrations, for insulating the one from the other, a sealed envelope of deformable resilient material such as an elastomer connecting the two members, one of the two rigid members exhibiting the shape of a flattened base, a portion at least of the said envelope having the shape of a cup receiving at its centre the other of the said members, and a material of high viscosity filling the said envelope.

Thus one of the rigid members exhibits a flattened shape, the envelope extending in a cylindrical manner in a direction substantially perpendicular to the plane of the said member in order to connect according to the shape of a cup with the second member the dimensions of which are distinctly smaller than those of the first member.

In one advantageous embodiment the insulator in accordance with the invention exhibits a geometrical axis of revolution connecting the centres of the two rigid members. By the choice of the geometrical dimensions of the envelope, of the nature of the envelope and of the characteristics of the viscous material contained, it is thus possible to obtain insulation on the three axes of an orthogonal system.

The viscosity of the material lies between 50,000 and 1,500,000 centistokes, it may for preference lie between 50,000 and 1,000,000 centistokes.

In one preferred embodiment these materials consist of a silicone grease. However, it could likewise consist of any materials exhibiting high viscosity, such as polyisobutyl tar, crude elastomers and others.

The elastic envelope connecting the two rigid members advantageously consists of, for example, a silicone elastomer. However, other elastomers compatible with the grease can be employed, for example, natural rubber, neoprene, butyl.

Preferably the damping characteristics of the material constituting the envelope lie between 0 and 25% of the critical damping. However, the influence of the damping from the envelope is low with respect to the general damping.

Thanks to the presence of a large mass of material of high viscosity within the envelope the insulator in accordance with the invention exhibits extremely high insulation characteristics. The damping characteristics which result from the nature of the material constituting the envelope, from its shape, especially in the portion in the shape of a cup, and from its cooperation with the viscous mass which is displaced during the oscillations of the envelope, are also particularly high.

These damping characteristics can be further increased by arranging on the member contained in the portion in the shape of a cup one or a number of members such as a rigid ring contained within the envelope and the plane of which, perpendicular to the axis of the insulator, enables damping to be provided in the viscous mass itself.

It is likewise possible, either in combination with this ring or separately, to make integral with the said rigid member one or a number of cushions, for example, of annular shape, of knitted metal wire the interstices in which are filled with viscous material.

In one particular embodiment of the invention, in which it is required that the insulator exhibit relatively high stiffness, it is possible to arrange either outside the envelope or inside it a spring bearing against the two rigid members. The spring is preferably contained within the envelope and can advantageously exhibit a helicospiral shape. The displacement of the spring in the viscous grease in that the case enables the damping characteristics to be increased further.

In one more particular embodiment of the invention the portion of the envelope extending in a substantially cylindrical manner from this flattened base may advantageously be made rigid by means of a rigid wall of substantially cylindrical shape extending from the said flattened base. More particularly the envelope can be moulded onto and round such a wall which can advantageously exhibit at its lower portion a right-angled flange intended to be made integral with the said flattened base. A joint coming preferably from the over-moulding is then compressed between this perpendicular flange and the flattened base to ensure the sealing of the insulator.

Figure 6:
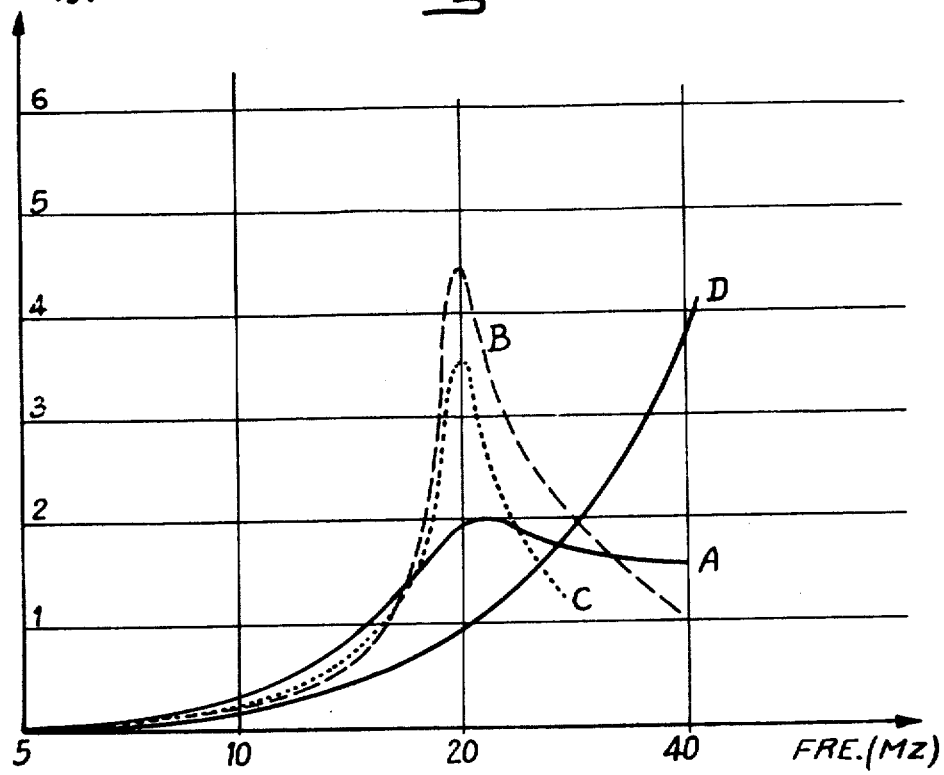

Other advantages and characteristics of the invention will appear upon reading the following description made by way of non-restrictive example, as well as from the attached drawing in which:

FIG. 1 represents a partial axial section of an insulator in accordance with the invention, FIG. 2 represents a view of the insulator from above, FIG. 3 represents an axial section of the envelope of the insulator furnished with a cylindrical wall with a flange and with one of the rigid members, FIG. 4 represents an axial section of an insulator in accordance with a variant upon the invention, FIG. 5 represents an axial section of an insulator in accordance with another variant upon the invention, FIG. 6 represents curves of acceleration as a function of the frequency of an insulator in accordance with the invention, of a conventional elastomer insulator and a conventional knitted cushion starting from one and the same input value of vibrations.

Reference is first of all made to FIGS. 1, 2 and 3.

The insulator in accordance with the invention comprises two rigid members 1 and 2 exhibiting a general shape of revolution about a common geometric axis 3. The upper rigid member 1 exhibits a cylindrical shape with a blind central threaded hole 4 enabling the fixing onto the said member of a member or any part of a system subjected to vibrations. The base of the insulator exhibits a plane central portion surrounded by a rib 5 beyond which extends a plane peripheral portion 6.

The two rigid members 1 and 2 are connected by an envelope or diaphragm 7 produced from elastomer material such as a silicone elastomer.

As is to be seen particularly in FIG. 3, this envelope 7 exhibits at the side next to the member 2 a cylindrical portion 8 surmounted by a portion in the shape of a cup 9 supporting in its centre the rigid member 1 to which it is attached by vulcanizing. It can be seen that inside the envelope 7 the portion 9 exhibits round the member 1 a substantially toroidal shape 10.

As seen in the drawing the cylindrical portion 8 of the envelope is moulded over and round a cylindrical metallic core 11 exhibiting at its upper portion a circular rib 12 and at its lower portion a flange 13 extending at a right angle, that is to say, in a direction substantially parallel with the peripheral portion of the rigid member 2. This flange 13 exhibits on its lower face a multiplicity of concentric ribs or rings 14 coming from the overmoulding and intended to be compressed between the flange 13 and the peripheral portion 6 when the flange and this portion are assembled together by assembly members such as 15. The interior of the sealed envelope 9 thus produced is filled with a grease 16 of a viscosity of 100,000 centistokes.

Advantageously the insulator illustrated can include in its interior a helicospiral spring 17 the bottom turn of which of largest diameter rests on the base 2 outside the rib 5, whilst the top turn of smallest diameter is held between a shoulder on the member 1 and a ring 18 fixed round an internal extension 19 of the member 1 the lower end of which is bent back round the ring.

Comparative tests have shown that an insulator in accordance with FIG. 1 exhibits the following characteristics:

inner diameter of the envelope: 30 mm.
inner height of the envelope in the toroidal portion 10 : 9 mm.
mean thickness of the envelope : 3mm.
elastic modulus of the envelope : 0.5kg/mm.
height of the cylindrical wall 11 : 13 mm.
stiffness of the spring : 0.37 kg/mm.
volume of the viscous silicone material : 17 cm$^3$
viscosity of the viscous silicone material : 100,000 centistokes
it exhibits as a function of the frequency a frequency response exhibited by the curve A in FIG. 6.

It is seen in particular that at the resonance frequency of 20 Hz the amplification factor at resonance is equal to or less than 2, being the ratio between the acceleration transmitted by the damper (2g) on the curve A and the input acceleration (1g) on the curve D.

Comparatively an elastomer insulator of silicone type working in compression-shear exhibits a response according to curve B, with a transmitted acceleration distinctly higher and a distinctly higher amplification factor. The same goes for a metallic insulator consisting of a cushion of knitted metal wire of spring-cushion type, the curve of response of which is represented by curve C.

It will also be understood that because the total volume of grease remains constant during the deformation of the envelope, one portion of the cup deforms by reducing the volume whilst another portion of the cup increases in volume. The complex motion increases the damping in the grease.

In conclusion it is seen that the amplification of an insulator in accordance with the invention is distinctly low relative to other known insulators.

Reference is made to FIG. 4.

In order to increase still further the damping characteristics of the insulator in FIG. 1 the ring of small diameter 18 can advantageously be replaced by a ring 20 extending across a much bigger diameter inside the envelope.

Under these conditions it effects considerable stirring of the viscous material inside the envelope, thus increasing the damping.

It may be very advantageous to surround the edge of the ring 20 with a cladding of elastomer 20a in order thus to constitute a damping stop, particularly in the event of too great transverse displacement of the member 1. Preferably the elastomer cladding 20a exhibits a peripheral groove.

According to FIG. 5 it is possible as a variant to increase the damping by adding to the ring 20 a cushion of knitted metal wire. Such a cushion can be provided in an annular shape arranged on the ring 20 as, for example, the cushion 21, or have an annular shape internally concave for being arranged on the ring 20 and fitting against the spring 17 like, for example, the cushion 22, or even being fixed directly against the extension 19 like, for example, the cushion 23. Of course other shapes of cushion are possible. In the movements of vibration these cushions cooperate with the viscous material arranged inside the envelope 7 in order to increase the damping of the insulator.

Besides remarkable performances by the insulator in accordance with the invention and by the damping, it is thus possible, which proves extremely useful in practice, to conceive and produce the insulator so as to deal separately with the damping characteristics without affecting the excellent insulating properties.

It is likewise possible to modify the nature or the thickness of the elastomer material constituting the envelope 7. It is likewise possible to affect the damping characteristics by modifying the shape of the envelope and especially its concavity in the zone 10. Further, it is possible by making these members vary, to obtain an insulator exhibiting perfect insulation and remarkable damping not only in the direction of the axis 3 but even in the perpendicular direction.

Although the invention has been described in reference to a particular form, it is of course in no way limited to it and various modifications in shape or in material can be applied without thereby departing either from its scope or its spirit.

I claim:

1. An insulator against vibrations, comprising in combination first and second rigid members adapted to be attached respectively to two parts of a system subjected to vibrations, for insulating one part from the other, one of the rigid members having a flattened shape, a sealed envelope of deformable resilient material connecting the two members with a portion at least of the said envelope turned inwardly to impart the shape of a cup to said envelope, said inwardly turned portion being flexible and receiving at its center the other of the said members, and a fluid of high viscosity filling the interior of the said envelope.

2. An insulator as claimed in claim 1, in which one of the said rigid members has the shape of a flattened base having a dimension which is large with respect to the dimension of the other rigid member which is retained in the center of said inwardly turned portion of the envelope, a cylindrical portion of the envelope being connected to the periphery of the said flattened rigid member.

3. An insulator as claimed in claim 2, in which the said cylindrical portion of the envelope is moulded over and round a rigid substantially cylindrical core.

4. An insulator as claimed in claim 3, in which the said rigid cylindrical core carries a flange extending parallel with the periphery of the said flattened rigid member to which it is attached with at least one sealing rib interposed therebetween.

5. An insulator as claimed in claim 1 in which the two rigid members are aligned along an axis of revolution of the insulator.

6. An insulator as claimed in claim 1 in which the viscosity of the material filling the interior of the envelope lies between 50,000 and 1,500,000 centistokes.

7. An insulator as claimed in claim 6 in which the said material of a silicone grease.

8. An insulator as claimed in claim 1, in which the envelope is made of silicone elastomer.

9. an insulator as claimed in claim 1 which includes a spring the ends of which bear respectively against the said two rigid members.

10. An insulator as claimed in claim 9 in which the spring is contained inside the envelope.

11. An insulator as claimed in claim 1 in which one portion of said other rigid member, positioned inside the envelope, supports a ring extending perpendicular to the axis of the said rigid member.

12. An insulator as in claim 11, in which the ring supports a resilient peripheral cladding.

13. An insulator as claimed in claim 1, in which one portion of said other rigid member, positioned inside the envelope, is integral with a cushion of knitted metal wire.

* * * * *